Oct. 28, 1952 P. B. SCOTT 2,615,641

MAGNETIC TAPE SOUND RECORDING AND REPRODUCING APPARATUS

Filed Aug. 22, 1951 2 SHEETS—SHEET 1

Inventor
PHILIP BODLEY SCOTT
By
Wilkinson & Mawhinney
Attorneys

Inventor
PHILIP BODLEY SCOTT

By Wilkinson & Mawhinney
Attorneys

Patented Oct. 28, 1952 2,615,641

UNITED STATES PATENT OFFICE 2,615,641

MAGNETIC TAPE SOUND RECORDING AND REPRODUCING APPARATUS

Philip Bodley Scott, Gerrards Cross, England, assignor of one-third to John Reginald Bryans and one-third to Cyril Ernest Stearns, both of London, England Application August 22, 1951, Serial No. 243,133
In Great Britain August 29, 1950

9 Claims. (Cl. 242—55)

This invention relates to improvements in sound recording and reproducing apparatus of the type on which the sound, e. g. speech, is recorded magnetically on a continuous tape of suitable material.

Conventional apparatus of this kind usually employs three motors of which one operates a capstan by which the tape is driven and the function of the other two is mainly to apply torques to a take-up and to a storage or wind-off spool respectively for tensioning the tape.

The present invention aims at meeting the requirements of apparatus of this class with the use of two motors only, or even only one, by the incorporation of improved tape driving means whereby the capstan and its separate motor are eliminated.

The requirements to be met include:

(I) ability to vary the tape speed during recording and reproduction by up to about plus and minus 20% of the mean speed;

(II) rapid re-wind;

(III) rapid on-wind, e. g. for resuming recording or reproduction at the point of leaving off after winding back for replay of an earlier passage.

In an apparatus according to the invention the take-up spool is driven by an electric motor through a change-speed transmission with controllable clutch means providing a choice between a fixed low-ratio of (motor to tape) and a range of higher ratios (of motor to tape) over which the ratio is continuously variable and providing also for disconnecting the take-up spool altogether from the motor; and means for applying a torque to the wind-off motor in the sense opposing wind-off are controlled by means interconnected with the control of the clutch means for enabling maximum torque to be applied to the wind-off spool for re-winding the tape and at the same time disconnecting the driving motor from the take-up spool, and for applying a reduced torque appropriate for partially braking the wind-off spool and maintaining the tape under tension and simultaneously connecting the driving motor to the take-up spool.

Preferably, a brake acting on the take-up spool is so controlled, by means interconnected with the control means of the above-mentioned clutch means, as to be released when the driving motor is connected to the take-up spool and also when maximum re-winding torque is applied to the wind-off spool.

The invention includes two alternative forms of the means for applying torque to the wind-off spool. In one form a separate variable-torque electric motor is permanently coupled to the wind-off spool; and in the other a mechanical transmission between the driving motor and the wind-off spool includes an electro-magnetically controlled slippable clutch adjustable either to a position in which the maximum torque applied to the driving member is transmitted or to a position in which a reduced, braking torque is transmitted.

In both cases the control may be effected by means of a two-position voltage control device controlling the input of the separate motor or of the electro-magnetic means controlling the slippable clutch as the case may be; or in the second case the slippable clutch may be of the magnetic type with variable air-gap controlled by a solenoid or electro-magnet, which is either fully energised or not energised, no voltage control being required.

The motor or motors are preferably of the shaded-pole synchronous type. When supplied with an input voltage somewhat less than half the normal voltage for synchronous running under load, a motor of this type will act as an effective brake without over-heating or overloading the installation.

In essentials, a preferred form of the change-speed gearing comprises a gear continuously driven by the driving motor, such gear being coaxial with and directly connectible to the take-up spool by a controllable clutch, a lay-shaft parallel to the take-up spool axis and carrying a gear driven by the first-mentioned gear, an idler friction wheel on an axis perpendicular to and intersecting the spool and lay-shaft axes and disposed between the lay-shaft gear and a plate fast on or integral with the take-up spool, means for axially shifting the lay-shaft gear to effect and break frictional contact between the idler friction wheel and both the lay-shaft gear and the plate on the take-up spool, and controllable means for shifting the idler friction wheel along its axis.

In order to obtain the appropriate gear ratios, a single stage of speed-reduction gearing is preferably interposed between the driving motor and the gear first mentioned above.

The accompanying drawings illustrate, by way of example only, two embodiments of the invention respectively incorporating one and the other of the alternative forms of the means for applying torque to the wind-off spool mentioned above. In the drawings, Figure 1 is a sectional elevation, on the line 1—1 of Figure 2, of the first embodiment;

Figure 1:
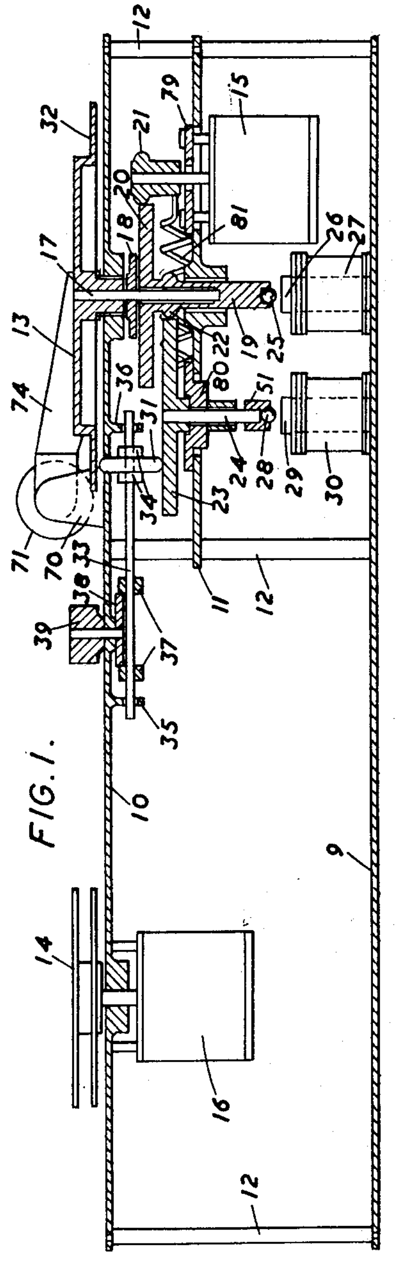
Figure 2:
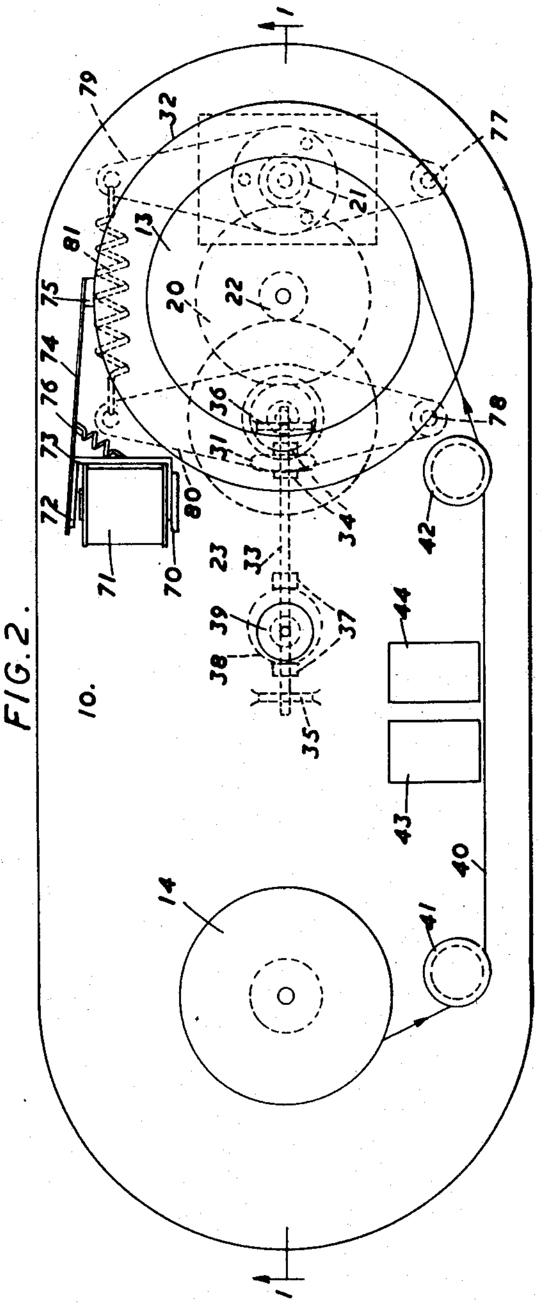
Figure 2 is a plan view of the same.

Referring to Figures 1 and 2, the tape winding mechanism and recording and reproducing devices are mounted on a frame comprising a base plate 9, a deck plate 10 and an intermediate plate 11 connected together by struts 12. 13 is the take-up spool onto which the tape 40 is wound from the wind-off spool 14, being taken over jockey pulleys 41, 42 past a recording and reproducing head 44 and an erasing head 43. The take-up spool is driven by a shaded-pole synchronous motor 15 and the wind-off spool by a shaded-pole synchronous motor 16, the latter being secured to the underside of the deck 10. The take-up spool 13 is journalled in deck 10 and has an extended shaft 17 on which a clutch plate 18 is fast. Journalled in the intermediate plate 11 and slidable coaxially on the shaft 17 is a hollow shaft 19 carrying a large gear 20 which is driven by a small gear 21 on the shaft of the motor 15. Shaft 19 also carries a small gear 22 which drives a large gear 23 fast on a lay-shaft 24 parallel to the shafts 17, 19. In the lower end of the shaft 19 is recessed a ball 25 engageable by the armature 26 of a solenoid 27, and similarly a ball 28 recessed into a collar 51 on the end of lay-shaft 24 is engageable by the armature 29 of a solenoid 30. Solenoids 27 and 30 are fixed to the base plate 9, and their armatures when attracted move upwards to engage the balls 25, 28, respectively.

Between the upper face of the gear 23 and the lower face of a plate 32 constituting the rim of the take-up spool 13 is an idler friction wheel 31 rotatable on a horizontal shaft 33 which is supported in brackets 35, 36, depending from the deck 10. The shaft 33 can slide axially in the brackets 35, 36 and carries cheeks 37, which locate the friction wheel 31 axially with respect to the shaft, and cheeks 34 between which is disposed an eccentric 38 journalled in the deck 10 and carrying an external knob 39. By rotating the knob 39 the shaft 33 carrying with it the friction wheel 31 can be shifted axially.

The shaft 33 is supported by the bracket 36 in a clearance hole or vertical slot allowing the friction wheel 31 to have a limited freedom to float vertically.

In the position shown both the solenoids 27 and 30 are open-circuited and the shafts 19 and 24 are in their lowest position in which there is a small clearance between the gear 20 and the clutch plate 18 and between the friction wheel 31 and the take-up spool rim-plate 32. When solenoid 27 is energised its armature 26 is attracted and rises to meet the ball 25 and raise the shaft 19 until the upper face of the gear 20 makes frictional contact with the clutch plate 18. In this position the take-up spool is driven by the motor 15 through a single stage of gear reduction 21, 20, giving a fixed, relatively low ratio between motor and spool. When the solenoid 27 is no longer energised the shaft 19 is allowed to drop and disengages the gear 20 from the clutch plate 18.

When the solenoid 30 is energised and attracts its armature 29, the latter rises, meets the ball 28 and raises the lay-shaft 24. The idler friction wheel 31 which rests on the upper face of the large gear 23 is therefore raised, being free to float vertically, until it makes frictional contact with the underside of the rim 32 of the take-up spool 13. This is then driven by the motor 15 through two fixed ratio stages of reduction 21, 18 and 22, 23 and a further stage of reduction furnished by the frictional engagement of the idler wheel 31 between the gear 23 and the spool rim-plate 32, the ratio of the last stage of reduction being continuously variable within limits by axially shifting the shaft 33 to vary the radial position of the idler wheel 31 with respect to the gear 23 and spool 13, giving a ratio of speed reduction between the motor and the take-up spool which is considerably greater than that of the "direct" drive through the clutch 20, 18, but is continuously variable over a limited range. It will be noted that in both cases the drive is in the same direction, i. e. that for taking up the tape.

The freedom of the idler wheel 31 to float vertically ensures good frictional contact between it and the take-up spool rim-plate 32 when the gear 23 is raised to meet it and avoids heavy loads on the bearing of the idler wheel, which is not kept rotating by the take-up spool, when disengaged from the gear 23.

In the example illustrated the gear is frictional throughout, the "gears" 21, 22 being in the form of frictional pinions whose faces are of rubber or the like and the "gears" 20, 23 being in the form of discs whose edges are frictionally engaged by the pinions 21, 22 and are deep enough to accommodate the axial relative movement caused by the axial displacement of shafts 19 and 24 by the solenoids 27 and 30. In order to ensure good frictional contact between the pinions 21, 22 and discs 20, 23 respectively, the motor 15 is mounted on a lever 79 pivoted on the intermediate plate 11 of the frame at 77 and the disc 23 and shaft 24 are journalled in another lever 80 pivoted on the plate 11 at 78. The free ends of these levers are connected by a tension spring 81 which draws the levers towards one another and causes the pinion 21 to be pressed against the edge of the disc 20 and the edge of the disc 22 to be pressed against the pinion 22.

In a bracket 70 secured to the deck 10 is mounted a solenoid 71 whose armature 72 pivotally mounted at 73 carries an extension 74, on the end of which is mounted a brake block 75 which is normally caused to bear against the edge of the rim-plate 32 of the take-up spool 13 by means of a tension spring 76. When the solenoid 71 is energised and attracts its armature 72 the brake is released.

Figure 3:
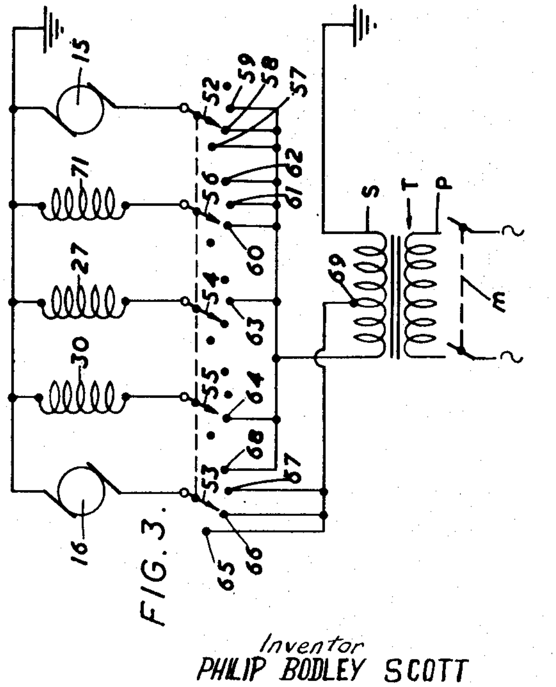
Figure 3 is a circuit diagram of this embodiment.

The electrical connections of this apparatus are shown in Figure 3, in which it will be seen that the take-up motor 15, the re-wind and braking motor 16 and the solenoids 27, 30 and 71 are all fed from the secondary *s* of a transformer T whose primary *p* is connected to the mains through a master switch *m*. The feed from the secondary of the transformer to the several items above-mentioned is through a five-pole switch having ganged moving contacts 52, 53, 54, 55, 56, which can be set in any one of four positions. This switch has fixed contacts 57 to 68 arranged as shown, of which contacts 57 to 64 inclusive and 68 are fed with the full voltage of the secondary of the transformer and contacts 65, 66 and 67 are fed with reduced voltage, being connected to an approximately central tapping 69 on the secondary. Numbering the four positions of the ganged switch from the left in Figure 4, in the first, or "off," position the contact 52 feeding the motor 15 is on fixed contact 57 and the motor 15 is therefore fed with the full secondary voltage. The contact 53 feeding the motor 16 is on fixed contact 65 and the motor 16 whose direction of rotation is opposed to that of motor 15, is, therefore, fed with reduced voltage, and the contacts 54, 55 and 56 feeding the solenoids 27, 30 and 71 are in the open position, so that all three solenoids are de-energised, and hence the drive from the motor 15 to the take-up spool 13 is completely disconnected and the brake 75 is applied to the take-up spool. Being fed only with reduced voltage, the re-wind motor 16 cannot exert enough torque to overcome the resistance of the brake 75 but merely keeps the tape taut and prevents it from going slack. In the second, or "recording and reproducing," position of the ganged switch the motor 15 is still fed with the full voltage through the moving contact 52 and fixed contact 58 and the motor 16 is still fed with reduced voltage through the moving contact 53 and fixed contact 66. The moving contact 56 of the brake solenoid 71 is on the fixed contact 60, thus feeding the brake solenoid with the full voltage and releasing the brake, the moving contact 54 of the solenoid 27 is in the open position so that the armature 26 of solenoid 27 is not attracted and the clutch 18, 20 is disengaged, and the moving contact 55 of solenoid 30 is fed through fixed contact 64 with the full voltage so that the armature 29 is attracted and causes the drive to be established from the motor 15 through the double reduction gearing 21, 20, 22, 23 and the continuously variable gearing 23, 31, 32. This causes the take-up spool 13 to be rotated at the appropriate speed for recording or reproducing, which can be varied at will within limits by adjustment of the knob 39. At the same time the motor 16, fed with reduced voltage, acts as a brake and applies sufficient tension to the tape to keep it taut. In the third, or "wind-on," position of the ganged switch the motor 15 is still fed with the full voltage through moving contact 52 and fixed contact 59 and the motor 16 is still fed with reduced voltage through the moving contact 53 and fixed contact 57, while the brake remains released, since the solenoid 71 is fed with the full voltage through the moving contact 56 and fixed contact 61; the solenoid 30 which engages the variable gear train through the idler wheel 31 is de-energised, the moving contact 55 being in the open position while the solenoid 27, which engages the "direct" drive from the motor 15 through the gear pair 21, 20 and clutch 18, 20, is energised with the full voltage through the moving contact 54 and the fixed contact 63. The motor 16 continues to apply a braking torque to the tape, but the take-up spool 13 is now driven at a relatively high speed by the motor 15, giving a quick wind-on. In the fourth, or "re-wind," position of the ganged switch both the moving contacts 54, 55 are in the open position so that neither of the solenoids 27, 30 are energised and the drive from the motor 15 to the take-up spool 13 is disengaged, and at the same time the motor 15 is not energised, since the moving contact 52 is in the open position; the brake continues to be released since the solenoid 71 is still energised with full voltage through the moving contact 56 and fixed contact 62, while the re-wind motor 16 is now energised with full voltage through moving contact 53 and fixed contact 68. The motor 16 therefore re-winds the tape onto the wind-off spool at high speed.

Figure 4:
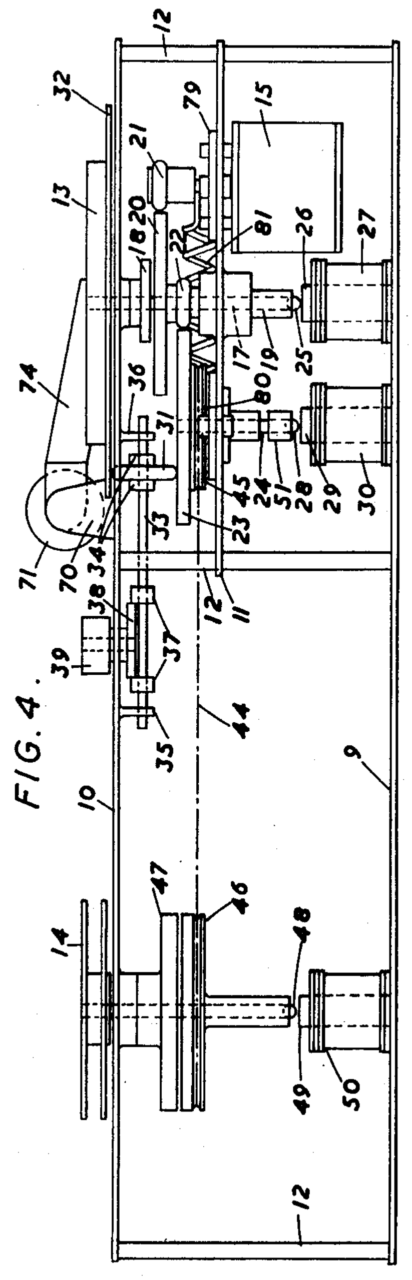
Figure 4 is a front elevation of the second embodiment.

The embodiment illustrated in Figure 4 differs only from that illustrated in Figures 1 and 2 by the elimination of the re-wind motor 16 (Figure 1) and its replacement by a belt drive from the gear or disc 23 through a slippable clutch. The lay-shaft 24 carrying the disc 23 also carries a pulley 45 connected by a belt 44 with a pulley 46 freely rotatable on the shaft of the wind-off spool 14 and axially slidable on it to a limited extent. The pulley 46 is magnetised and forms with a similar magnetised disc 47 fast on the shaft of the wind-off spool 14 a magnetic clutch, whose air-gap can be varied by raising and lowering the pulley 46. For this purpose a loose ball 48 is recessed into the bottom of the hollow shaft of pulley 46 and is engageable by the armature 49 of a solenoid 50 secured to the base plate 9.

Figure 5:
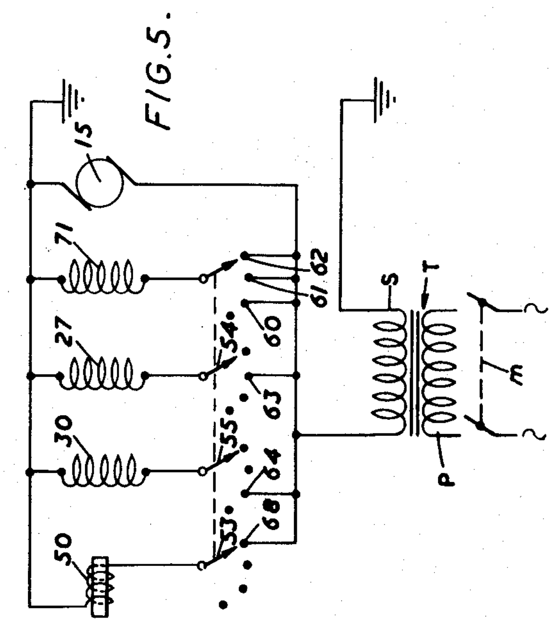
Figure 5 is a circuit diagram thereof.

The winding of solenoid 50 is connected to the moving contact 53 of the ganged switch 53 to 56, as shown in the circuit diagram (Figure 5), which differs from that of Figure 3 in that the moving contact, 52, of Figure 3 is eliminated, the motor 15 being permanently connected across the whole of the secondary, *s*, of the transformer T, and the central tapping, 69, of Figure 3 and the fixed contacts 65, 66, 67 connected to it are omitted. In other respects the circuits of Figure 5 are the same as those of Figure 3. When the ganged switch is in any of the first three positions mentioned above corresponding to "off," "recording and reproducing," and "wind-on," the moving contact 53 is open-circuited and the solenoid 50 is not energised. This allows the pulley 46 to drop and increase the air-gap of the clutch 46, 47, causing it to slip and to transmit a reduced torque to the wind-off spool 14 in the re-winding sense, thereby keeping the tape under tension while the latter is being wound onto the take-up spool or the latter is held stationary by the brake 75. In the fourth or "re-wind" position of the ganged switch the moving contact 53 is on the fixed contact 68 and feeds the solenoid 50 with the full secondary voltage of the transformer so that the armature 49 is attracted and raises the pulley 46, thus reducing the air-gap of the clutch 46, 47 and causing it to transmit the full torque applied to pulley 46 by the motor 15 through the belt 44, and drive the wind-off spool 14 substantially without slip in the re-winding sense, the brake 75 beng released as in the corresponding switching position of the embodiment of Figures 1 to 3.

I claim:

1. Sound recording and reproducing apparatus of the type employing a magnetic tape as the sensitive element and including a tape-take-up spool and a tape-wind-off spool, an electric motor, transmission means providing two alternative driving connections from the motor to the take-up spool, one such connection being of fixed ratio giving the spool a relatively high speed for a given motor speed, and the other including adjustable frictional gearing and means for adjusting the ratio of the last mentioned gearing in a continuously variable manner to give the spool any selected speed within a range of relatively low speeds for the same given motor speed, clutch means for engaging and disengaging each transmission connection, selector control means for such clutch means enabling either such connection to be engaged selectively and also enabling both to be disengaged simultaneously, means for applying a torque to the wind-off spool in the sense opposing wind-off and torque-control means for reducing said torque to a relatively low value as is appropriate for partially braking the wind-off spool and maintaining tension on the tape, and for enabling the maximum available torque to be applied for rewinding purposes, and means interconnecting said torque-control means with the clutch control means for applying reduced torque to keep the tape under tension when the driving motor is connected to the take-up spool and for disconnecting the driving motor from the take-up spool when the maximum re-winding torque is applied to the wind-off spool.

2. Apparatus as claimed in claim 1 including two electromagnetic clutch operators, one for engaging the fixed-ratio transmission connection and the other for engaging the variable-ratio transmission connection, and in which the clutch selector control means comprises selector switch means for energising each clutch operator separately and alternatively and for isolating them both simultaneously.

3. Apparatus as claimed in claim 1 including two electromagnetic clutch operators for engaging the fixed-ratio and variable-ratio transmission connections respectively, selector switch means for energising each clutch operator separately and alternatively and for isolating them both simultaneously, a brake acting on the take-up spool and electromagnetic brake-actuating means controlled by the selector switch means for releasing the brake when either clutch operator is energised.

4. Apparatus as claimed in claim 1, in which the means for applying torque to the wind-off spool comprises a separate motor permanently connected to the wind-off spool and the torque control means comprises a two-position voltage control device in the circuit of the said separate motor.

5. Apparatus as claimed in claim 1 in which the means for applying torque to the wind-off spool comprises a mechanical transmission between the driving motor and the wind-off spool, such transmission including a slippable clutch, and the torque control means comprises electromagnetic clutch-operating means providing alternatively for transmission of maximum torque substantially without slip and for transmission, with slip, of a reduced, braking, torque.

6. Apparatus as claimed in claim 1 including an electromagnetic clutch operator for engaging each of the mentioned clutch means, electromagnetic means controlling the torque applied to the wind-off spool, a two-position voltage controller in the circuit of the torque controlling means, and in which the clutch selector control means comprises selector switch means, said switch means also controlling the voltage controller so as to apply a reduced voltage to the torque-controlling means and thereby apply an appropriately reduced braking torque to the wind-off spool, except in one position of the selector switch means, in which position both electromagnetic clutch-operators are isolated and maximum voltage is applied to the torque-controlling means to apply maximum re-winding torque to the wind-off spool.

7. Apparatus as claimed in claim 1, in which the clutch selector control means includes a selector switch, said apparatus further including an electromagnetic clutch operator for engaging the fixed-ratio transmission connection, an electromagnetic clutch operator for engaging the variable-ratio transmission connection, a brake acting on the take-up spool and an electromagnetic brake operator, all said electromagnetic operators and the mentioned torque control means being controlled by the selector switch which has four positions, in the first of which the clutch operators are isolated, the brake is applied and a reduced torque is applied to the wind-off spool, in the second and third positions one and the other respectively of the clutch operators are energised, the brake is released and reduced torque is applied to the wind-off spool, and in the fourth position both clutch operators are isolated, the brake is released and full re-winding torque is applied to the wind-off spool.

8. Apparatus as claimed in claim 1, whereof the transmission and clutch means providing two alternative connections from the driving motor to the take-up spool comprises a motor shaft, a small gear fast on the motor shaft, a larger gear coaxial with and loose on the take-up spool and driven by said small gear, a clutch operative to connect the larger gear to the take-up spool, a second small gear fast on the last named gear, a lay-shaft parallel to the axis of the take-up spool, a second larger gear fast on the lay-shaft and driven by the second small gear, a plate fast on the take-up spool, a friction wheel disposed between the lay-shaft gear and said plate for rotation about an axis perpendicular to and intersecting the lay-shaft and take-up spool axes, means for axially shifting the lay-shaft gear to effect and to break frictional contact between the lay-shaft gear and the friction wheel and between the latter and the plate on the take-up spool, and means for axially shifting the friction wheel to vary continuously the transmission ratio between the lay-shaft gear and the take-up spool.

9. Apparatus as claimed in claim 1, whereof the transmission and clutch means providing two alternative connections from the driving motor to the take-up spool comprises a motor shaft, a small gear fast on the motor shaft, a larger gear coaxial with and loose on the take-up spool and driven by said small gear, a clutch operative to connect the larger gear to the take-up spool, a second small gear fast on the last named gear, a lay-shaft parallel to the axis of the take-up spool, a second larger gear fast on the lay-shaft and driven by the second small gear, a plate fast on the take-up spool, a friction wheel disposed between the lay-shaft gear and said plate for rotation about an axis perpendicular to and intersecting the layshaft and take-up spool axes, means for axially shifting the lay-shaft gear to effect and to break frictional contact between the lay-shaft gear and the friction wheel and between the latter and the plate on the take-up spool, mounting means for the friction wheel allowing it limited freedom to float perpendicularly to its axis, and means for axially shifting the friction wheel to vary continuously the transmission ratio between the lay-shaft gear and the take-up spool.

PHILIP BODLEY SCOTT.

REFERENCES CITED

The following references are of record in the file of this patent:

UNITED STATES PATENTS

| Number | Name | Date |
|---|---|---|
| 1,381,791 | Byrd | June 14, 1921 |
| 1,718,355 | Hutchison | June 25, 1929 |
| 1,939,181 | McCash et al. | Dec. 12, 1933 |
| 2,180,793 | Carlson | Nov. 21, 1939 |

FOREIGN PATENTS

| Number | Country | Date |
|---|---|---|
| 255,749 | Switzerland | Feb. 1, 1949 |
| 459,035 | Great Britain | Dec. 31, 1936 |